United States Patent Office 2,770,527
Patented Nov. 13, 1956

2,770,527

TERNARY FERROUS GROUP METAL SULFIDES OF MOLYBDENUM AND TUNGSTEN AND THEIR PREPARATION

Witty Lysle Alderson, Jr., and John T. Maynard, Wilmington, Del., assignors to E. I. du Pont de Nemours & Company, Wilmington, Del., a corporation of Delaware No Drawing. Application May 28, 1953,
Serial No. 358,158

18 Claims. (Cl. 23—134)

This invention relates to new metal sulfides and to methods for their preparation. More particularly, this invention relates to new ternary metal sulfides and especially to certain new ternary metal sulfides which are ferromagnetic and to methods for their preparation.

Because of the limited visible supply of cobalt, intensive efforts are being made to find ferromagnetic materials which equal or surpass it in frequency response, magnetic permeability, strength and other desirable characteristics. Furthermore, the natural reserves of cobalt are being depleted even as demand increases, which makes the search for ferromagnetic materials of great urgency and importance.

It is an object of this invention to provide new ternary metal sulfides and methods for their preparation. A further object is to provide certain new ternary metal sulfides which are ferromagnetic. A still further object is to provide novel methods by which these new ternary metal sulfides can be easily and readily prepared. Other objects will appear hereinafter.

These and other objects of this invention are accomplished by providing new ternary metal sulfides wherein the sulfur is combined with a ferrous group metal and a metal of the group of molybdenum and tungsten. A new class of ferromagnetics has been found in the ternary sulfides of iron and a metal of the group of molybdenum and tungsten.

These new ternary ferrous group metal sulfides are conveniently made by bringing an inert gas, such as helium, in contact with a mixture of from 1 to 2 gram moles of a ferrous group metal sulfide per gram mole of a sulfide of a non-ferrous metal of the group molybdenum and tungsten, heated to between 500° and 1300° C., preferably between 800° and 1300° C. In place of using preformed sulfides, the sulfides can be made in situ from the metals or their oxides and hydrogen sulfide, in which event the sulfidation is effected at 300° to 500° C. until evolution of sulfur and water has ceased. Thereafter, the hydrogen sulfide is replaced by a stream of inert gas, e. g., helium, and the temperature raised to between 500° and 1300° C., where it is held for from 10 minutes to 4 hours.

The examples which follow are submitted to illustrate and not to limit this invention. Parts are by weight unless otherwise specified.

Example I

A mixture of 5.76 parts of molybdic anhydride, $MoO_3$, and 3.18 parts of ferric oxide, $Fe_2O_3$, is heated in a rapid stream of hydrogen sulfide at 400° C. for 1½ hours, after which time evolution of water and sulfur has ceased. The hydrogen sulfide stream is then replaced with one of helium and the reaction furnace is heated to 1200° C., where it is held for 10 minutes. The furnace is then allowed to cool, and the product removed from the furnace. It is a lead-gray crystalline solid which has a metallic lustre and strong ferromagnetic properties. Analysis shows the composition to be approximately $FeMoS_{2.5}$, and the X-ray diffraction pattern shows it to contain no molybdenum or iron sulfides, but to consist of a new, previously unknown phase.

Example II

An intimate mixture of 8.0 parts molybdenum disulfide and 4.40 parts ferrous sulfide is heated in a stream of helium to about 1300° C. for a period of 20 minutes. When the furnace has cooled the product is found to consist of steel-gray metallic crystals which are strongly ferromagnetic. Elemental analysis shows the composition to be approximately $FeMoS_{2.5}$, while the X-ray pattern shows it to be a new compound.

Example III

A mixture of 4.64 parts of tungstic oxide, $WO_3$, and 1.76 parts of ferrous sulfide, FeS, is heated to 1100° C. in a stream of hydrogen sulfide for 3 hours. The product consists of 6.68 parts of a gray-black, finely crystalline, strongly ferromagnetic solid. Elemental analysis shows it to have the composition $FeWS_3$, while the X-ray powder pattern shows it to consist of a new compound containing some residual $WS_2$.

Example IV

A mixture of 3.2 parts of molybdenum disulfide and 1.69 parts nickelous oxide was ball milled for one-half hour to insure intimate mixing and was heated in a stream of hydrogen sulfide for two hours at 1000° C. The hydrogen sulfide stream was then replaced with one of helium and the temperature raised to 1200° C. and held for one hour. On cooling there resulted 4.06 parts of a steel-gray crystalline solid. An X-ray powder pattern indicated the formation of a previously unidentified compound containing some residual unreacted molybdenum disulfide and analysis showed the composition to be approximately $MoNiS_3$, molybdenum nickel sulfide.

Example V

A mixture of 3.2 parts of molybdenum disulfide and 1.66 parts of cobaltic oxide was treated as in Example IV. The resulting steel-gray crystalline solid was similar in appearance to the molybdenum nickel sulfide of the previous example, and analytical data showed its composition to be approximately $MoCoS_3$. The X-ray powder pattern indicated the presence of a certain amount of molybdenum disulfide in addition to the new, previously unrecognized molybdenum cobalt sulfide.

The foregoing examples illustrate preferred specific embodiments and are not to be construed as delineating the scope of this invention, either as to reactants or reaction conditions.

In general ternary ferrous group metal sulfides of this invention correspond in composition to $A_xMS_y$, in which A is a ferrous group metal, i. e., iron, nickel, or cobalt, M is molybdenum or tungsten. In most instances $x$ is 1 to 2 and $y$ is 2.5 to 3. In these new ternary metal sulfides, the sulfur is chemically combined with a ferrous group metal and with molybdenum or tungsten.

These ternary sulfides can be conveniently made by sintering at atmospheric pressure a mixture of from 1 to 2 gram moles of the ferrous group metal sulfide per gram mole of sulfide of molybdenum or tungsten. In place of using preformed sulfides, oxides or the free metals, or mixtures thereof can be used and the sulfides formed in situ. In general, it is preferred to form the sulfides in situ from free metals or their oxides because of the ease with which sulfidation with hydrogen sulfide can be effected. When the sulfides are formed, in situ, it is desirable to carry out the process in two steps. The first step is the sulfidation which is conducted at temperatures of 300° to 500° C., using hydrogen sulfide or any material which under the conditions of reaction yields hydrogen sulfide. The second step is the sintering step and is carried out at 500° to 1300° C., preferably between 800° to 1300° C., in the presence of an inert gas, such as helium or nitrogen. Hydrogen sulfide can be used in place of the inert gas as shown in Example III.

The process is conducted at atmospheric pressure and this has practical advantages in simplifying equipment requirements and reducing costs. The time of reaction depends upon the nature of the reactants, the temperature, and concentration of the hydrogen sulfide or inert gas, as the case may be. When the free metals are employed, the reaction is generally permitted to continue until hydrogen and sulfur are essentially absent from the discharge gas stream. With mixed oxides the reaction is carried on until water and sulfur no longer appear in the discharge gases.

The oxides and sulfides of iron, nickel, and cobalt used in the practice of this invention are those corresponding to binary combinations of these metals with oxygen or sulfur. Examples are FeS, $FeS_2$, $Fe_2S_3$, FeO, $Fe_2O_3$, $Fe_3O_4$, NiO, NiS, CoO, CoS, and the like.

The molybdenum or tungsten sulfides and oxides are binary compounds of molybdenum or tungsten with either oxygen or sulfur. Examples are $MoS_2$, $Mo_2S_3$, $MoO_2$, $Mo_2O_3$, $WO_3$, $WO_2$, $WS_3$, $WS_2$, and the like.

The ternary ferrous group metal sulfides of this invention are useful as ceramic pigments and as components of metal glazes and finishes. The new ternary iron sulfides are strongly ferromagnetic and are also useful in all applications where such magnetic products are employed, for example, in magnetic core materials.

As many apparently widely different embodiments of this invention may be made without departing from the spirit and scope thereof, it is to be understood that this invention is not limited to the specific embodiments thereof, except as defined in the appended claims.

We claim:

1. A method for preparing ternary metal sulfides which comprises bringing hydrogen sulfide into contact with a mixture of a ferrous group metal sulfide and a sulfide of a non-ferrous metal selected from the class consisting of molybdenum and tungsten, said mixture being heated to a temperature between 500° and 1300° C. and the ratio of ferrous group metal sulfide to said non-ferrous metal sulfide in said mixture being from 1 to 2 gram moles of ferrous group metal sulfide per gram mole of non-ferrous metal sulfide.

2. A method for preparing ternary metal sulfides which comprises bringing hydrogen sulfide into contact with a mixture of an iron sulfide and a tungstic oxide heated to a temperature of 800° to 1300° C., the ratio of iron sulfide to tungstic oxide in said mixture being such as to provide from 1 to 2 gram moles of iron sulfide per gram mole of tungstic sulfide.

3. A method for preparing ternary metal sulfides as set forth in claim 1 wherein said ferrous group metal sulfide is formed in situ by bringing hydrogen sulfide into contact with an oxide of said ferrous group metal heated to a temperature above 300° C.

4. A method for preparing ternary metal sulfides as set forth in claim 1 wherein said sulfide of a non-ferrous metal is formed in situ by bringing hydrogen sulfide into contact with an oxide of said non-ferrous metal heated to a temperature above 300° C.

5. A method for preparing ternary metal sulfides as set forth in claim 1 wherein said ferrous group metal sulfide is formed in situ by bringing hydrogen sulfide into contact with said ferrous group metal heated to a temperature above 300° C.

6. A method for preparing ternary metal sulfides as set forth in claim 1 wherein said sulfide of a non-ferrous metal is formed in situ by bringing hydrogen sulfide into contact with said non-ferrous metal heated to a temperature above 300° C.

7. A method for preparing a ternary iron molybdenum sulfide which comprises bringing hydrogen sulfide into contact with a mixture of an iron sulfide and a molybdenum sulfide heated to a temperature of 500° to 1300° C., the ratio of iron sulfide to molybdenum sulfide in said mixture being from 1 to 2 gram moles of iron sulfide per gram mole of molybdenum sulfide.

8. A method for preparing a ternary iron molybdenum sulfide as set forth in claim 7 wherein said iron sulfide and molybdenum sulfide are formed in situ by bringing hydrogen sulfide into contact with an iron oxide and a molybdenum oxide heated to a temperature above 300° C.

9. A ternary ferrous group metal sulfide characterized by being a crystalline solid stable at temperatures within the range of 500° to 1300° C. and corresponding in chemical composition to the general formula $AMS_y$ wherein sulfur S is chemically combined with a ferrous group metal A and with a metal selected from the class consisting of molybdenum and tungsten in atomic ratio of y:1:1, y being 2.5 to 3.

10. The ternary iron molybdenum sulfide characterized by being ferromagnetic and by being a crystalline solid corresponding in chemical composition to the formula $FeMoS_{2.5}$ wherein sulfur is chemically combined with iron and molybdenum in atomic ratio of 2.5:1:1.

11. The ternary iron tungsten sulfide characterized by being ferromagnetic and by being a crystalline solid corresponding in chemical composition to the formula $FeWS_3$ wherein sulfur is chemically combined with iron and tungsten in atomic ratio of 3:1:1.

12. The ternary nickel molybdenum sulfide characterized by being a crystalline solid corresponding in chemical composition to the formula $MoNiS_3$ wherein sulfur is chemically combined with nickel and molybdenum in atomic ratio of 3:1:1.

13. The ternary cobalt molybdenum sulfide characterized by being a crystalline solid corresponding in chemical composition to the formula $MoCoS_3$ wherein sulfur is chemically combined with cobalt and molybdenum in atomic ratio of 3:1:1.

14. A method for preparing ternary metal sulfides which comprises heating and reacting at a temperature of 800 to 1300° C. in a hydrogen sulfide atmosphere, a ferrous group metal sulfide with a sulfide of a non-ferrous group metal selected from the class consisting of molybdenum and tungsten, the amount of ferrous group metal sulfide present in the reaction mixture being from 1 to 2 gram moles per gram mole of non-ferrous group metal sulfide.

15. A method for preparing a ternary metal sulfide as set forth in claim 14 wherein said ferrous group metal sulfide is an iron sulfide, said sulfide of a non-ferrous group metal is a molybdenum sulfide, and said ternary metal sulfide is a ternary iron molybdenum sulfide.

16. A method for preparing a ternary metal sulfide as set forth in claim 14 wherein said ferrous group metal sulfide is an iron sulfide, said sulfide of a non-ferrous group metal is a tungsten sulfide, and said ternary metal sulfide is a ternary iron tungsten sulfide.

17. A method for preparing a ternary metal sulfide as set forth in claim 14 wherein said ferrous group metal sulfide is a nickel sulfide, said sulfide of a non-ferrous group metal is a molybdenum sulfide, and said ternary metal sulfide is a ternary nickel molybdenum sulfide.

18. A method for preparing a ternary metal sulfide as set forth in claim 14 wherein said ferrous group metal sulfide is a cobalt sulfide, said sulfide of a non-ferrous group metal is a molybdenum sulfide, and said ternary metal sulfide is a ternary cobalt molybdenum sulfide.

References Cited in the file of this patent
UNITED STATES PATENTS 1,548,279   Pike _____ Aug. 4, 1925

OTHER REFERENCES

Hoffmann: "Lexikon der Anorganischen Verbidungen," vol. 2, pages 616, 730 and 733 (1912–1914).

Gmellin-Krauts: "Handbuch der Anorganischen Chemie" (1909), vol. 5, part 1, pages 157 and 159.